Jan. 19, 1926.  1,570,349
G. HOLLINWOOD
COMBINATION TIME INDICATOR AND SIGHTING COMPASS
Filed Jan. 20, 1923   2 Sheets-Sheet 2
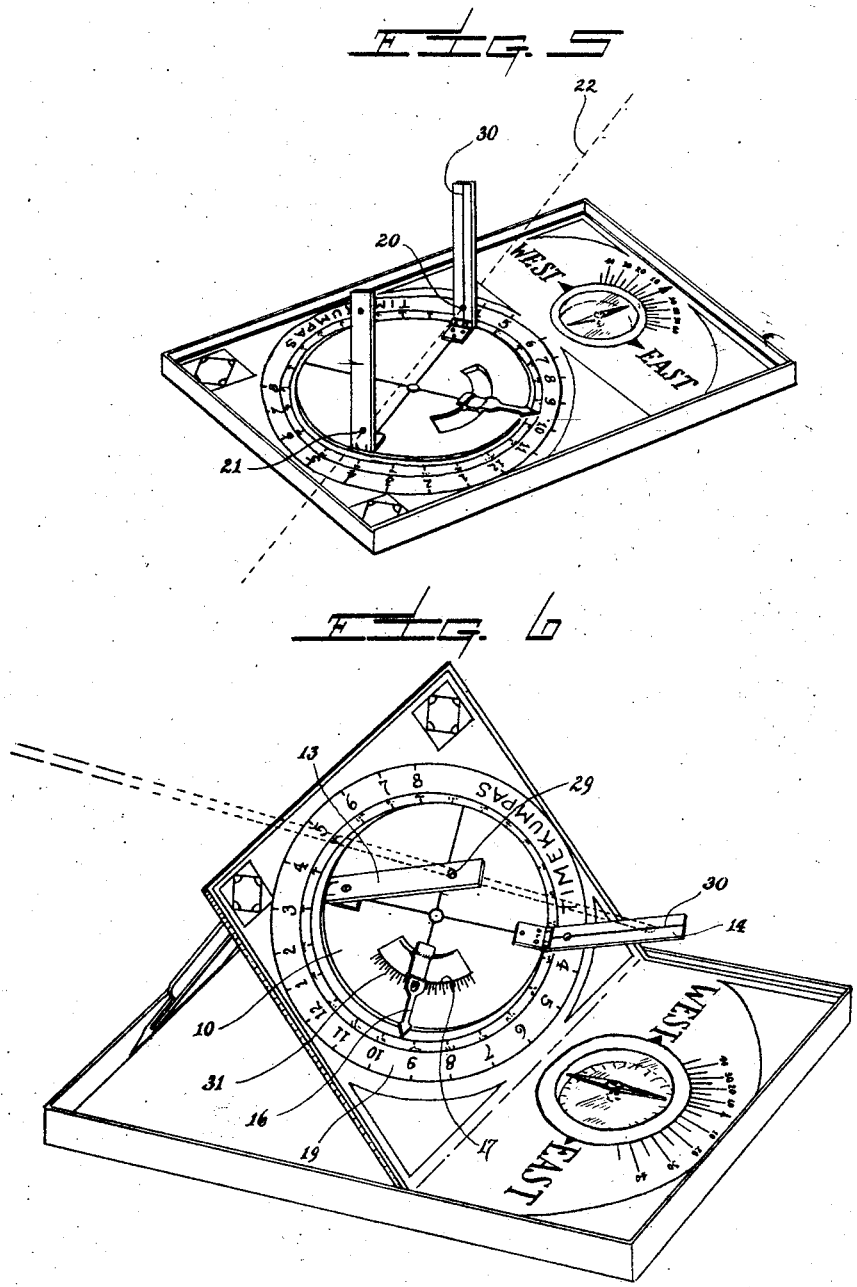
INVENTOR.
GEORGE HOLLINWOOD.
BY
ATTORNEY.

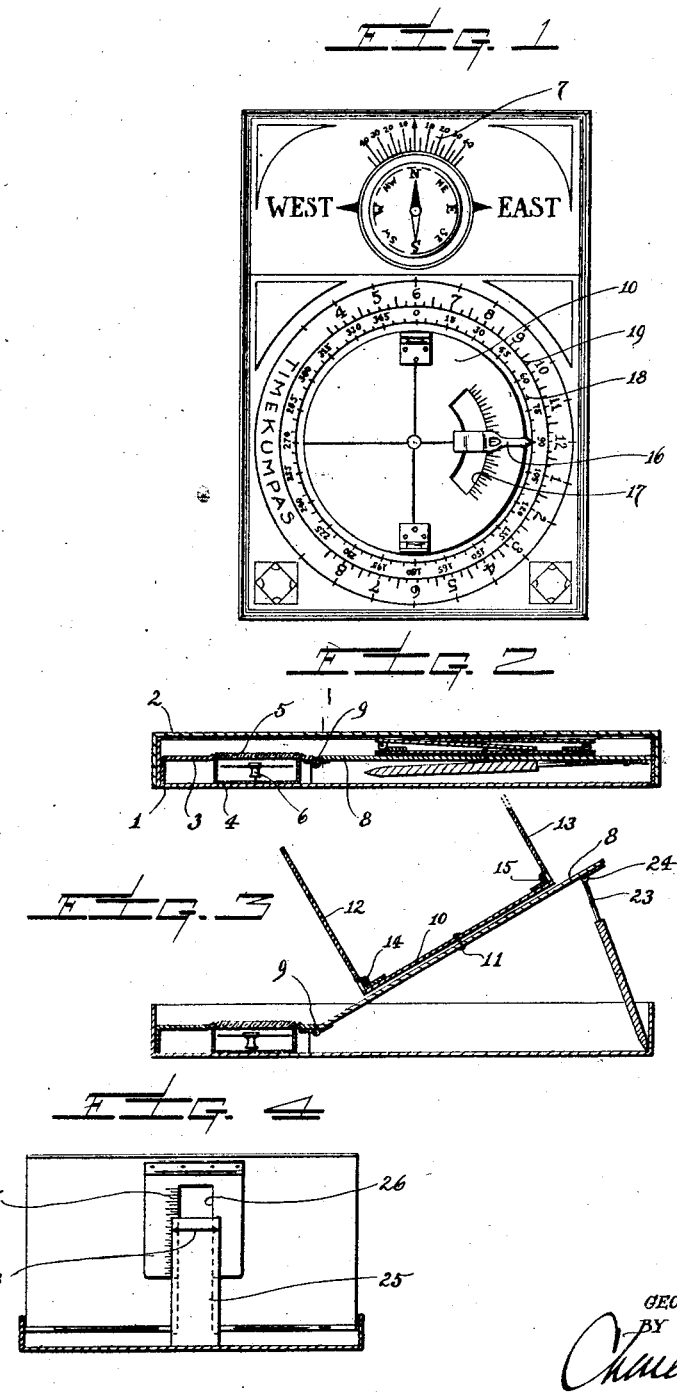

Patented Jan. 19, 1926.

1,570,349

UNITED STATES PATENT OFFICE.

GEORGE HOLLINWOOD, OF CRANFORD, NEW JERSEY.

COMBINATION TIME INDICATOR AND SIGHTING COMPASS.

Application filed January 20, 1923. Serial No. 613,804.

*To all whom it may concern:*

Be it known that I, GEORGE HOLLINWOOD, residing at Cranford, in the county of Union and State of New Jersey, have invented certain new and useful Improvements in a Combination Time Indicator and Sighting Compass, of which the following is a specification.

This invention relates to a sighting compass combined with means by which the time of day may be determined by the direction of the sun's rays.

One of the objects of the invention is to provide a simple, easily used instrument of the type described, in which the various parts are compactly arranged so that the instrument may be carried about from place to place.

Another object of the invention is to provide a combined instrument of the type described, provided with means by which the bearing of a distant visible point may be readily determined, these parts also being capable of use to determine the time of day.

Another object of the invention is to provide an instrument of the type described, which is readily portable, and by means of which the combined function of a compass and a sun dial are performed, the means serving the latter purpose being capable of adjustment so that the instrument will be accurate at the places of different latitude.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings, wherein I have shown a preferred form of embodiment of my invention:

Figure 1 is a top plan view of the device.

Figure 2 is a longitudinal cross-section.

Figure 3 is a cross-section similar to Figure 2, but showing the parts in operative position.

Figure 4 is an end view of the device in operative position, as illustrated in Figure 3.

Figure 5 is a view of the device with the parts in position for determining the bearing of a distant point; and Figure 6 is a view showing the parts in operative position for telling time.

Referring now to the drawings, wherein similar reference characters refer to similar parts throughout the several views thereof, the reference character 1 designates a box-like container which may be made of any suitable light material, such as thin brass. Obviously, if this material is to be metal, it must be non-magnetic, inasmuch as a compass is to be mounted within it. This box-like container is provided with a removable cover 2, which simply fits over the upstanding walls of the member 1. At one end the container 1 is provided with a partition 3, within which is to be placed a compass 4, the compass having an observation door 5, which will lie flush with the partition 3. This is shown more particularly in Fig. 2.

Within the compass 4 is the usual needle 6, mounted on a pivot in the customary manner. As seen in Fig. 1, there is provided a deflection scale 7, showing degrees on either side of the north and south line, this scale being mounted on the upper face of the partition 3, which also bears a pair of indicating lines showing the east and west directions. The compass is provided with the usual card showing the various directions thereon.

The partition 3 provides an inner compartment within the container 1, which extends only a short distance longitudinally thereof, and in the second compartment of the container there lies a plate 8 hinged to the partition as at 9. This plate is provided with a central dial 10 pivotally mounted as at 11, this pivot lying in the extension of the north-south line of the compass. At opposite ends of a diameter of this dial there is placed a pair of arms 12 and 13, these arms being hinged as at 14 and 15 to the dial 10, the hinge being of such form that the arms 12 and 13 may be raised to the vertical position and held there against movement by friction.

Mounted on the dial 10, along a diameter at right angles to the diameter connecting the arms 12 and 13 is a pointer 16, this pointer being disposed within an arcuate slot 17, the arc of which corresponds to the curve of the dial, the construction being more clearly shown in Fig. 5. The pointer 16 projects a slight distance beyond the edge of the dial and may be set at different points within the slot 17.

Disposed on the plate 8 concentrically with the dial 10 are two rows of characters providing scales, the inner row 18 being divided off into degrees, the zero point lying along the north and south line of the compass. The outer scale, designed by the reference character 19, is designed to indicate the hours of the day, and as will be seen, begins at approximately 3½, runs through 12, and ends at 8½, these designations indicating the hours of the day during which there will be sunlight. The pointer 16 extends beyond the end of the dial 10 such a distance that the reading on the outer scale may readily be made.

In order that the device may be used for determining the bearing of a visible point, there is provided a pair of sighting apertures 20 and 21, disposed through the upstanding arms 12 and 13 on the median line thereof, these apertures being located near the hinges 14 and 15 at equal distances from the hinges.

In use the instrument will be placed on a flat surface and moved until the north and south indicating line will correspond with the position taken by the compass needle. Inasmuch as the compass will vary somewhat with the latitude, this deflection may be taken care of by the scale 7. The instrument having been disposed so that its longitudinal axis lies along the north and south line, the plate 10 with the arms 12 and 13 upstanding, will then be moved on its pivot, so that the distant point may be sighted by the eye through the aligned apertures 20 and 21 as indicated by the dotted line 22 in Figure 5.

When this position has been reached, the bearing of the point may be readily determined from the degree scale mounted on the plate 8. When it is desired to determine the time of day, the plate 8 will be moved to a tilted position on its hinges 9. In order to maintain the plate in the necessary position, there is provided a swinging support member 23, which is hinged at 24 near the outer edge of the plate 8. This member 23 is made in two parts; the lower part 25 being mounted in a slot 26 in the portion 23, so that it may be moved along the slot to tilt the plate 8 to different angles.

The angular position which must be assumed by the plate 8 will depend on the latitude, and at the Equator, in order to cause the device to be operative, the plate would necessarily be placed in the vertical position with regard to the flat support on which the instrument is to be placed. In other latitudes the plate will be tilted, and the angle of tilt will be determined by the position of the member 25 within its slot.

In order to determine this position accurately, the member 23 is provided with a scale 27, which is subdivided into units corresponding with the degrees of latitude, and there is provided an index 28 on the member 25, so that the plate 8 may be raised to any desired position in accordance with the latitude of the place where the instrument is to be used.

Having placed the instrument in position so that its longitudinal axis lies along the north and south line, the necessary correction having been made for the deflection, the plate 8 will now be tilted to the position as determined by the latitude. The arm 13 will be seen to have been provided with an aperture 29 disposed through the median line thereof at a point near its outer end, and on the inner face of the arm 14 there is provided a median line 30 for a purpose now to be described.

With the plate 8 tilted in proper position, the dial 10 will be moved until the shadow of the arm 13 directly overlies the arm 14. The rays of the sun passing through the aperture 29 will then appear as a light spot on the inner face of the arm 14, and the dial 10 will be moved until this spot lies along the median line 30. With the apparatus in this position the indicator pointer 16, which as has been explained, lies along a diameter at right angles to the diameter connecting the arms 13 and 14, will give a reading on the time dial 19, which reading will be the sun-time. Inasmuch as the sun-time will vary during different months of the year, and inasmuch as it may be necessary under certain conditions to indicate the so-called "daylight saving time" rather than a true sun-time, there is provided, as has been explained, a slot 17 in which the pointer 16 is movable. Along this slot on the dial 10 there will be provided a scale 31, by means of which the pointer 16 may be disposed in position so as to give the corrected time reading. As has been explained, the angular position of the plate 8 is adjustable in accordance with the latitude and the pointer 16 is adjustable further to take care of the necessary corrections in accordance with the month of the year.

It will thus be seen that the device is suitable for telling time under all geographical conditions, as well as under conditions in which corrections must be made. When it is desired to use the device simply for sighting or compass purposes, the plate 8 will be folded down to the position indicated in Fig. 5, whereupon the arms 12 and 13 will be raised or lowered, as may be necessary.

In order to make the device more readily useful, I have provided a cover 2 for the container, and on the inner face of this cover there are located different tables showing the latitudes of various cities and other localities, together with the necessary deflection required when the device is used in such locations. By reference to such a table the required deflection may be easily arrived at, and the corrections made in the placing of the container.

While I have shown a sliding support 23 and 25 by means of which the plate 8 may be raised to various angular positions, obviously where the construction is not limited to such an arrangement, there may be provided for example, an arcuate plate with a set screw by means of which the tilt of the plate 8 may be determined. The same statement may be made with reference to the construction of the upstanding arms 13 and 14 and the pointer 16. The constructions here set forth, however, are thoroughly satisfactory for the purposes for which they are devised, although I do not desire that I be limited to such construction.

Having thus described my invention what I claim as new and desire to secure by Letters Patent is:

1. A device of the class described, comprising in combination, a compass, a dial rotatably supported adjacent thereto and having its axis of rotation in the north-south line of said compass, a pair of arms disposed diametrically on said dial, a plate having a scale located adjacent said dial, and a pointer on said dial adapted to read on said scale.

2. A device of the class described, comprising in combination, a compass, a dial rotatably supported adjacent thereto and having its axis of rotation in the north-south line of said compass, a pair of arms disposed diametrically on said dial, a plate having a scale located adjacent said dial, means to support said dial and said scale angularly of the horizontal, and a pointer on said dial adapted to read on said scale.

3. A device of the class described, comprising in combination, a compass, a dial rotatably mounted adjacent thereto and having its axis of rotation in the north-south line of said compass, a pair of arms disposed diametrically on said dial, a plate having a scale located adjacent said dial, means to support said dial and said scale in angular position in accordance with the latitude of the geographical location of said device, a pointer on said dial adapted to read on said scale, and means on said arms whereby the diameter of said dial along which they lie may be placed parallel with the rays of the sun.

4. A device of the class described, comprising in combination, a compass, a dial rotatably mounted adjacent thereto and having its axis of rotation in the north-south line of said compass, a pair of arms disposed diametrically on said dial, a scale located adjacent said dial, means to support said dial and said scale in angular position in accordance with the latitude of the geographical location of said device, a pointer on said dial adapted to read on said scale, and a sighting aperture on one of said arms and a line marked on the other of said arms whereby the diameter of the dial along which said arms lie may be placed parallel with the rays of the sun.

5. A device of the class described comprising in combination, a compass, a plate mounted parallel to the plane of said compass, a dial rotatably supported on said plate with its axis of rotation in the north-south line of said compass, a pair of arms on said dial disposed diametrically thereof, a plate having a scale disposed concentrically of the axis of said dial, and a pointer on said dial adapted to read on said scale.

6. A device of the class described, comprising in combination, a compass, a plate mounted parallel to the plane of said compass, a dial rotatably supported on said plate with its axis of rotation in the north-south line of said compass, a pair of arms on said dial disposed diametrically thereof, a plate having a scale disposed concentrically of the axis of said dial, a pointer on said dial adapted to read on said scale, and means to support said plate in angular position in accordance with the latitude of the geographical location of said device.

7. A device of the class described, comprising in combination, a compass, a plate mounted parallel to the plane of said compass, a dial rotatably supported on said plate with its axis of rotation in the north-south line of said compass, a pair of arms on said dial disposed diametrically thereof, a plate having a scale disposed concentrically of the axis of said dial, and a pointer radially mounted on said dial and adapted to read on said scale.

8. A device of the class described, comprising in combination, a compass, a plate mounted parallel to the plane of said compass, a dial rotatably supported on said plate with its axis of rotation in the north-south line of said compass, a pair of arms on said dial disposed diametrically thereof, a plate having a scale disposed concentrically of the axis of said dial, a pointer adjustably mounted radially of said dial and adapted to read on said scale, and means to support said plate in different positions angularly of the horizontal.

9. A device of the class described, comprising in combination, a compass, a plate mounted parallel to the plane of said compass, a dial rotatably supported on said plate with its axis of rotation in the north-south compass line, a pair of arms hingedly mounted on said dial diametrically thereof, one of said arms being provided with a sighting aperture, the other having an axial line marked thereon, said plate being provided with a plurality of scales concentrically of said dial, a pointer adjustably mounted on said dial and extending radially thereof to read on one of said scales, and means to support said plate in varying angular positions relative to the horizontal.

10. A device of the class described, comprising in combination, a compass, a plate mounted parallel to the plane of said compass, a dial rotatably supported on said plate with its axis of rotation in the north-south compass line, a pair of arms hingedly mounted on said dial diametrically thereof, one of said arms being provided with a sighting aperture, the other having an axial line marked thereon, said plate being provided with a plurality of scales disposed concentrically of said dial, a pointer adjustably mounted on said dial and extending radially thereof to read on one of said scales, and a swinging adjustable arm mounted on said plate and adapted to support said plate in varying angular positions relative to the horizontal.

11. A device of the class described, comprising in combination, a container, having a horizontal partition in one end thereof, a compass mounted in said partition, a plate hinged to said partition, a dial pivotally mounted on said plate with its pivotal point lying along the north-south line of said compass, a pair of arms diametrically disposed on said dial, said plate being provided with a scale disposed concentrically of said dial, a pointer radially disposed on said dial to read on said scale, and means on said plate co-operating with said container to support the former in angular position relative to the latter.

12. A device of the class described, comprising in combination, a container, having a horizontal partition in one end thereof, a compass mounted in said partition, a plate hinged to said partition, a dial pivotally mounted on said plate with its pivotal point lying along the north-south line of said compass, a pair of arms diametrically disposed on said dial, said plate being provided with a scale disposed concentrically of said dial, a pointer radially disposed on said dial to read on said scale, means on said plate co-operating with said container to support the former in angular position relative to the latter, and means on said arms whereby the diameter of said dial along which they lie may be placed parallel with the rays of the sun.

13. A device of the class described, comprising in combination, a container, having a horizontal partition in one end thereof, a compass mounted in said partition, a plate hinged to said partition, a dial pivotally mounted on said plate with its pivotal point lying along the north-south line of said compass, a pair of arms diametrically disposed on said dial, said plate being provided with a scale disposed concentrically of said dial, a pointer radially disposed on said dial to read on said scale, means on said plate co-operating with said container to support the former in angular position relative to the latter, a sighting aperture on one of said arms, and a line marked on the opposed face of said other arm, whereby said dial may be positioned with its diameter through said arms parallel to the rays of the sun.

14. A device of the class described, comprising in combination, a container, having a horizontal partition in one end thereof, a compass mounted in said partition, a plate hinged to said partition, a dial pivotally mounted on said plate with its pivot lying along the north-south line of said compass, a pair of arms provided with sighting apertures, mounted diametrically of said dial, said plate being provided with a plurality of scales disposed concentrically of said dial, a pointer adjustably mounted radially of said dial to read on one of said scales, a swinging adjustable arm mounted on said plate and adapted to bear against said container to support said plate in varying angular positions relative thereto, a second sighting aperture in one of said arms, and a line marked on the other of said arms, whereby when said dial is in angular position, it may be placed with the diameter along which said arms lie in parallel with the rays of the sun.

In testimony whereof, I affix my signature.

GEORGE HOLLINWOOD.